United States Patent
Ahlborn et al.

(10) Patent No.: US 8,362,658 B2
(45) Date of Patent: Jan. 29, 2013

(54) DETERMINATION OF THE LOAD CAPABILITY OF A DC VOLTAGE SOURCE WHICH IS CONNECTABLE TO AN ELECTRIC POWER GRID VIA AN INVERTER AND A GRID DISCONNECT SWITCH

(75) Inventors: Alexander Ahlborn, Kassel (DE); Wilfried Groote, Vellmar (DE); Wolfgang Reichenbaecher, Staufenberg (DE)

(73) Assignee: SMA Solar Technology AG, Niestetal (DE)

( * ) Notice: Subject to any disclaimer, the term of this patent is extended or adjusted under 35 U.S.C. 154(b) by 536 days.

(21) Appl. No.: 12/622,578

(22) Filed: Nov. 20, 2009

(65) Prior Publication Data

US 2010/0127576 A1    May 27, 2010

(30) Foreign Application Priority Data

Nov. 25, 2008  (EP) ..................... 08169831

(51) Int. Cl.
    *G05F 3/06*   (2006.01)
(52) U.S. Cl. ......... 307/151; 324/120; 324/511; 324/520
(58) Field of Classification Search .................. 307/151; 324/76.11, 120, 511, 520; 363/49, 56.03, 363/79, 95; 702/65; 700/297, 286; 340/658
See application file for complete search history.

(56) References Cited

U.S. PATENT DOCUMENTS

| | | | | |
|---|---|---|---|---|
| 6,111,767 A * | 8/2000 | Handleman | ..................... | 363/95 |
| 6,810,339 B2 * | 10/2004 | Wills | .............. | 702/65 |
| 6,933,714 B2 * | 8/2005 | Fasshauer et al. | .......... | 324/76.21 |
| 7,079,406 B2 * | 7/2006 | Kurokami et al. | ......... | 363/56.03 |
| 7,269,036 B2 | 9/2007 | Deng et al. | | |
| 2005/0018454 A1 | 1/2005 | Deng et al. | | |
| 2009/0027037 A1 * | 1/2009 | Strnad et al. | ............... | 324/76.11 |
| 2009/0303763 A1 * | 12/2009 | Yuguchi et al. | ................. | 363/79 |
| 2010/0188869 A1 * | 7/2010 | Fredette et al. | ................. | 363/15 |

FOREIGN PATENT DOCUMENTS

| | | |
|---|---|---|
| DE | 4325436 A1 | 2/1995 |
| DE | 4328511 A1 | 3/1995 |
| WO | WO 2007086413 A1 * | 8/2007 |

* cited by examiner

*Primary Examiner* — Jared Fureman
*Assistant Examiner* — Alfonso Perez Borroto
(74) *Attorney, Agent, or Firm* — Leydig, Voit & Mayer, Ltd.

(57) ABSTRACT

A method for determining a load capability of a direct current ("DC") voltage source connectable to an alternating current ("AC") power grid having a predetermined frequency via an inverter and a grid disconnect switch includes controlling, while the grid disconnect switch is in an open position, the inverter so as to convert a DC input voltage to a test frequency different than the predetermined frequency of the AC power grid so as to increase a test load acting on the DC voltage source above an internal consumption of the inverter at the predetermined frequency. The DC input voltage is measured while the grid disconnect switch is in the open position.

22 Claims, 5 Drawing Sheets

DETERMINATION OF THE LOAD CAPABILITY OF A DC VOLTAGE SOURCE WHICH IS CONNECTABLE TO AN ELECTRIC POWER GRID VIA AN INVERTER AND A GRID DISCONNECT SWITCH

CROSS-REFERENCE TO PRIOR APPLICATIONS

Priority is claimed to European Patent Application No. EP08169831, filed on Nov. 25, 2008, which is hereby incorporated by reference herein.

FIELD

The present invention relates to a method and apparatus for determining the load capability of a DC voltage source which is connectable to an AC power grid of predetermined frequency via an inverter and a grid disconnect switch.

BACKGROUND

In a simple case, the load capability of the DC voltage source is determined from its open-circuit voltage before it is switched into the grid via the inverter. However, this open-circuit voltage is present when there is no load on the DC voltage source, and therefore, it does not adequately reflect the instantaneous performance of the DC voltage source. For example, if at the time a photovoltaic module is switched into the grid in the morning, the weather conditions are unfavorable, the photovoltaic module may indeed reach the voltage threshold required for it to be switched into the grid, but may still not deliver a power output which, after subtracting the internal consumption of the downstream inverter; i.e., the power required to operate the inverter, would be sufficient to keep the inverter permanently connected to the AC power grid in feed-in mode. As a result, shortly after the inverter is switched into the grid, it is preferably disconnected from the grid again. The resulting additional switching operations considerably reduce the service life, in particular that of the grid disconnect switch.

In one approach, a DC input voltage, which may be the output voltage of the DC voltage source or the voltage of a DC link of the inverter, is measured when the grid disconnect switch is still open but the inverter is already activated, so that the internal consumption of the inverter acts on the DC voltage source as a small test load. The output voltage of the DC voltage source is thus no longer the pure open-circuit voltage thereof. However, the internal consumption of the inverter is generally too low to serve as a test load to determine whether or not the DC voltage source can be switched into the grid. That is, the load capability of the DC voltage source as determined with the aid of the internal consumption still does not adequately represent the load that can be placed on the DC voltage source at the time it is switched into the grid.

German document DE 43 25 436 C2 describes a method including short-circuiting a DC voltage source through the inverter while the grid disconnect switch is still open to thereby place a higher test load on the DC voltage source prior to switching it into the grid. However, this procedure leads to heavy loading of the inverter components carrying the short-circuit current and is in contradiction to the objective of giving all components of the device used a long service life.

U.S. Pat. No. 7,269,036 B2 describes an approach in which the load capability of a DC voltage source is determined only after the DC voltage source has been switched into the AC power grid. The load capability so determined is used as a basis to determine the open-circuit voltage of the DC voltage source that must be reached before the next attempt is made to switch it into the AC power grid. In this manner, it may indeed be possible to determine an optimized value for the open-circuit voltage for the future as an indication of a sufficient load capability of the DC voltage source; however, in this way, only a small number of unsuccessful attempts to connect to the grid and associated stresses on the grid disconnect switch will be preventable as compared with using a fixed voltage threshold for the open-circuit voltage. In addition, according to U.S. Pat. No. 7,269,036 B2, the load capability of the DC voltage source that is already switched into the AC power grid is determined measuring the DC current flowing from the DC voltage source. The measuring device required for this purpose is not present in most of the inverter-based devices to which the present invention is directed.

SUMMARY

It is an aspect of the present invention to provide a method for determining the load capability of a DC voltage source, which will enable the DC voltage source to be switched into the AC grid via the inverter at an optimum point in time at which there is no risk of having to disconnect it from the grid again and which is determined such that the DC voltage source will not remain disconnected from the AC grid for unnecessarily long periods of time.

In an embodiment, the present invention provides a method for determining a load capability of a DC voltage source connectable to an A power grid having a predetermined frequency via an inverter and a grid disconnect switch. The method includes controlling, while the grid disconnect switch is in an open position, the inverter so as to convert a DC input voltage to a test frequency different than the predetermined frequency of the AC power grid so as to increase a test load acting on the DC voltage source above an internal consumption of the inverter at the predetermined frequency; and measuring the DC input voltage while the grid disconnect switch is in the open position.

BRIEF DESCRIPTION OF THE DRAWINGS

The present invention will now be further described and illustrated with reference to a specific exemplary embodiment and the accompanying drawings, in which.

DETAILED DESCRIPTION

Figure 1:
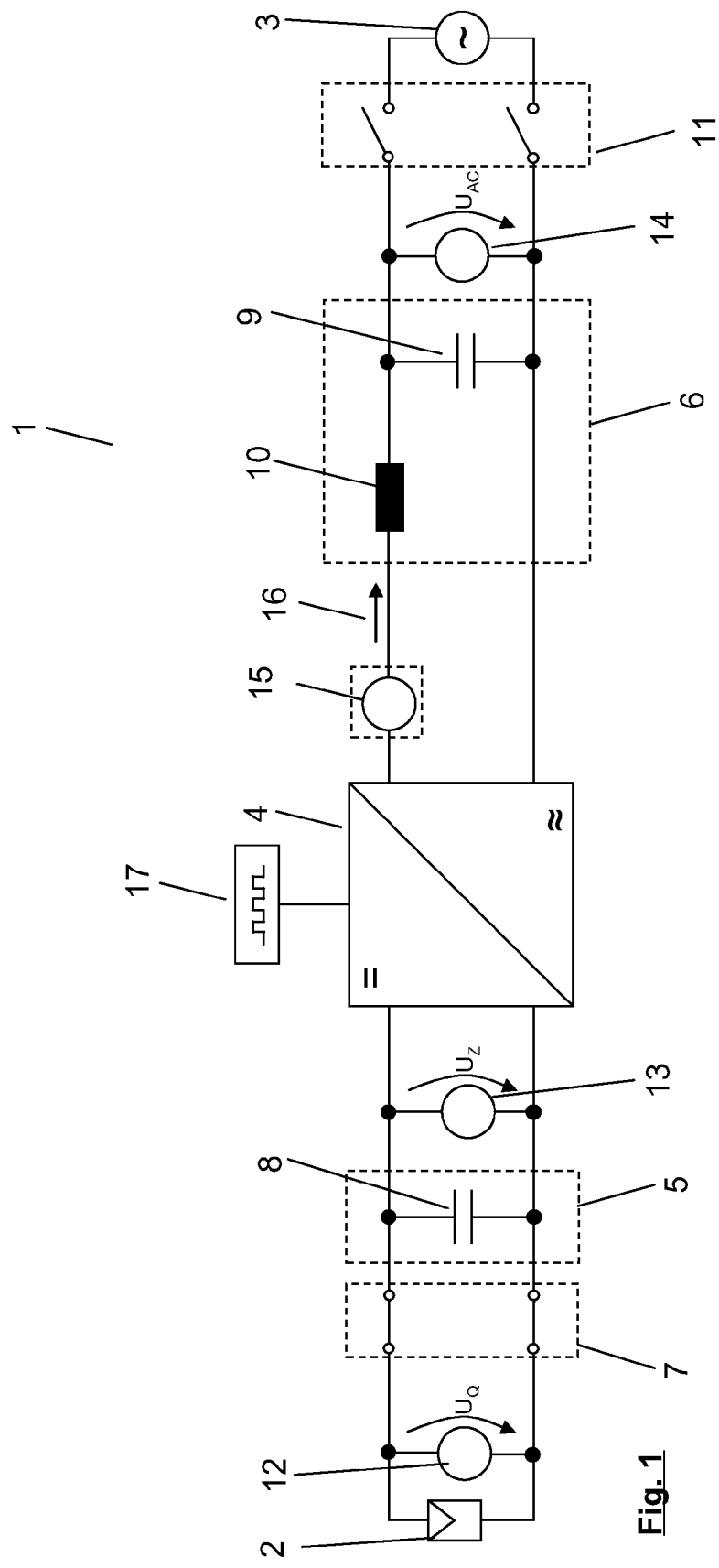
FIG. 1 shows the configuration of a device for feeding electrical energy from a DC voltage source into an AC power grid while carrying out the method in accordance with an embodiment of the present invention for determining the load capability of the DC voltage source.

An embodiment of the present invention may be used for decentralized power infeed into an AC power grid, which may be a utility grid, an isolated grid, or also the power supply to an individual consumer. The inverter is used to convert DC voltage generated by the DC voltage source (e.g., a photovoltaic, wind or hydroelectric system or a DC generator) into grid-compliant AC voltage and to feed electrical power from the DC voltage source into the AC power grid.

To maximize the share of renewable energies in the total energy consumption, it is desirable to connect the DC voltage source to the grid as early and for as long as possible. At the same time, it is important that the components of a device used for this purpose be protected from wear and damage to the extent possible, so as to give this device as long a life as possible. Therefore, the DC voltage source should be switched into the grid after its load capability reaches a sufficient level, but not before.

In the novel method for determining the load capability of a DC voltage source which is connectable to an AC power grid of predetermined frequency via an inverter and a grid disconnect switch, a DC input voltage of the inverter, which may be the output voltage of the DC voltage source or a voltage in a DC link of the inverter, is measured when the grid disconnect switch is open and the inverter may in an embodiment be controlled in a manner enabling four-quadrant operation, the inverter being controlled to convert the DC input voltage to a test frequency different from the frequency of the grid. "Different" is understood in this context to mean that the test frequency may be either lower or higher than the grid frequency. In the present invention, the frequency will often be higher than the grid frequency. The above procedure allows a test load acting on the DC voltage source to be increased significantly above the internal consumption of the inverter at grid frequency, provided the test frequency is suitably selected with respect to the particular inverter and its environment of use. In particular, the test load can generally be readily increased to a level equivalent to the load that is placed on the DC voltage source when it is switched into the grid, which makes it possible to determine in a timely and reliable manner whether the DC voltage source can be switched into the grid without risk.

If, while the grid disconnect switch is open, the inverter is controlled in such a manner that the DC input voltage is successively converted to different test frequencies, at least one of which is different from the frequency of the grid, it is possible, in particular, to also determine the response of the DC voltage source to load changes. In addition to the absolute load capability, said response is an important criterion for determining whether the DC voltage source can be switched into the AC power grid without risk.

With regard to the response to changes in load, the manner in which the DC voltage source responds to load changes, especially to step changes in load, but also to gradual load changes, is of particular importance. In order to simulate said load changes, the inverter can be controlled, while the grid disconnect switch is open, in such a manner that the test load acting on the DC voltage source is varied accordingly; preferably in a stepped manner.

Depending on the particular design of the inverter and its environment of use, it may be sufficient for the test frequency to differ from the grid frequency by 10 percent to generate a test load that will allow clear conclusions to be drawn about the load capability of the DC voltage source.

However, preferably, the test frequency is at least 20 percent lower or higher, more preferably at least 40 percent lower or higher, even more preferably at least 60 percent lower or higher, and most preferably at least 100 percent lower or higher than the grid frequency.

At a grid frequency in a typical range of 50-60 Hz, a test frequency which is higher than the grid frequency may have a typical order of magnitude of about 1 kHz; i.e., it may be between about 500 and 8.000 Hz, so that, for example, when the fast-clocked switches of the inverter are clocked at a typical frequency of 16 kHz, said test frequency can readily be obtained. If the fast-clocked switches of the inverter are clocked at a different frequency, it may be more convenient to use a test frequency in a different range. Preferably, the test frequency should not be more than 50 percent of this clock frequency.

Because of the difference between the test frequency and the grid frequency, any AC resistances and switching resistances in the region of the inverter, a DC link, or downstream components up to the open grid disconnect switch can be used to increase the test load to the desired level. However, it is preferable to tune the test frequency to be near the resonant frequency of an EMC (electromagnetic compatible) filter interconnected between the inverter and the grid disconnect switch, or near that of a similar (possibly cascaded) RLC component internal to the inverter, preferably, the test frequency to be such that the actual resonant frequency and a defined tolerance range are avoided. Such an EMC filter is present in many of the devices to which the present invention is directed. If the test frequency gets close to the resonant frequency of the EMC filter, the inverter can generate an increased, but not uncontrolled AC current while, for example, the voltage between the outputs of the EMC filter is comparatively low and does not exceed the limitations imposed by the components. In four-quadrant operation, for example, the inverter can act as a load resistance for this AC current and thereby provide the desired test load. In this connection, since the AC current flowing through the inverter is significantly smaller than the current at which the inverter is designed to transmit maximum energy from the DC voltage source into the AC power grid, there is substantially no likelihood of the inverter being overloaded, or being loaded to an extent that would significantly reduce its service life. The use of the above-described method does not result in an increase in temperature that could jeopardize the integrity or service life of the inverter.

In order to measure the particular test load that is applied to the DC voltage source as a result of the difference between the test frequency and the grid frequency, it is possible to measure the AC current from and/or an AC voltage across the EMC filter. However, the determination of the absolute value of the test load is of interest if the absolute load that will later be placed on the DC voltage source when it is switched into the AC power grid is known. In practice, therefore, it may be sufficient to determine whether the test load which was obtained using a certain test frequency and which did not cause an excessive dip in the DC input voltage was high enough to check whether the DC voltage source has sufficient load capability for continuous load operation of the inverter on the grid, before it is switched into the AC power grid. If this is not the case, the test load is suitably adjusted. To this end, the test frequency can be changed as a function of a known relationship between the test load and the test frequency. However, using the principles of fuzzy logic, the ideal test frequency can also be approached without knowledge of such a relationship, or even if such a relationship does not exist.

Using such a learning algorithm, the test frequency can be adapted to the particular inverter at the beginning of its operation to account for the tolerances of its components and environment of use, and also during its operation, for example, to compensate for any aging processes that may occur.

The learning algorithm may use a database of reference data, first of all to select a starting point for the test frequency near the expected ideal test frequency, and secondly to change the test frequency in the correct direction from the start without having to determine the correct direction by trial. The magnitude of the change can also be selected based on the reference data.

The learning algorithm can be carried out in steps during normal switching of the DC voltage source into the AC power grid via the inverter. The goal of this is to find the optimum compromise between avoiding further disconnections from the grid on the one hand and, on the other, switching the DC voltage source into the AC power grid as early as possible.

It will be understood that when carrying out the novel method, the DC voltage source is switched into the AC power grid via the inverter by closing the grid disconnect switch after it is established that there is sufficient load capability. This load capability manifests itself in that the dip in the DC input voltage of the inverter at a specific test frequency remains within maximum permissible limits. If the load capability defined in this manner turns out to be too low for subsequent power infeed from the DC voltage source into the AC power grid from via the inverter, it is not only possible to change the test frequency as described above, but also to reduce the maximum permissible drop in the DC input voltage. On the other hand, the requirements on the load capability that the DC voltage source must satisfy before it is switched into the AC power grid is preferably kept as low as possible in order for the DC voltage source to be connected to the grid as early as possible.

A device for carrying out the novel method has a controller that controls the inverter in accordance with the novel method of an embodiment of the present invention. The device preferably includes an EMC filter interconnected between the inverter and the grid disconnect switch.

The advantages of features and of combinations of a plurality of features mentioned in the introductory part of the description only serve as examples and may be used alternatively or cumulatively without the necessity of embodiments according to the invention having to obtain these advantages. Additional features are to be taken from the drawings—the illustrated geometries and the relative dimensions of several components with respect to each other, as well as their relative arrangement and operative connection. The combination of features of different embodiments of the present invention or of features of different claims deviating from the selected relationships between the claims is also possible and suggested herewith. This also relates to features that are illustrated in separate figures of the drawing or that are named in their descriptions. These features may also be combined with features of different claims. Furthermore, it is possible that features mentioned in the claims may be omitted in other embodiments of the invention.

The device 1 schematically illustrated in FIG. 1 is used for feeding electrical energy from a DC voltage source 2 into an AC power grid 3. Device 1 includes an inverter 4, which is connected to an upstream DC link 5 and to a downstream EMC filter 6. DC voltage source 2 is connected to inverter 4 via a switch 7 (shown closed in FIG. 1). DC link 5 is a voltage link including a DC link capacitor 8. In the present exemplary embodiment, the EMC filter includes an EMC capacitor 9 and an EMC inductor 10. Generally speaking, embodiments of the present invention may be based on any type of RLC combinations, including internal ones and combinations having a different design than an EMC filter, such as ones having a cascaded design. EMC filter 6 is interconnected between inverter 4 and grid disconnect switch 11 to provide periodic, e.g., sinusoidal alternating current to the AC power grid when grid disconnect switch 11 is in the closed position. Just as switch 7, grid disconnect switch 11 may be in the form of a relay or a contactor. During the process of determining the load capability of DC voltage source 2 according to the present invention, grid disconnect switch 11 is in the open position, such as shown in FIG. 1. Device 1 includes a plurality of measuring devices. A voltmeter 12 measures the output voltage $U_Q$ of DC voltage source 2. A voltmeter 13 measures the DC link voltage $U_Z$ across DC link capacitor 8. Voltage $A_{AC}$, which is present at the output of EMC filter 6, is measured by a voltmeter 14. Optionally, AC current 16 on the AC side of inverter 4 is measured by an ammeter 15. Inverter 4 is controlled by a controller 17 which determines the frequency to be delivered by inverter 4. In addition, controller 17 controls the individual switches of inverter 4 using pulse-width modulation at high frequency in such a way that AC current 16 is approximately sinusoidal already upstream of EMC filter 6. If, for example, a photovoltaic system is used as the DC voltage source 2, the output voltage $U_Q$ increases with the intensity of irradiation after the sun rises. Once a certain $U_Q$ level is reached, device 1 is put into operation and switch 7 is closed. Inverter 4 starts operating at no load. In order to prevent a dip in voltages $U_Q$ and $U_Z$, which would occur in response to the closure of grid disconnect switch 11 and the thereby caused connection of DC voltage source 2 to AC power grid 3 via inverter 4 if the load capability of DC voltage source 2 were still insufficient to allow power infeed into the grid, the load capability of DC voltage source 2 is determined prior to closing grid disconnect switch 11 by applying a test load thereto and simultaneously measuring a DC input voltage of the inverter, said DC input voltage being the output voltage $U_Q$ of DC voltage source 2 and/or the DC link voltage $U_Z$. In order to apply this test load to DC voltage source 2 while grid disconnect switch 11 open, controller 17 can in an embodiment control inverter 4 in such a way that four-quadrant operation is possible and that AC current 16 is not converted to the grid frequency of AC power grid 3, but to a test frequency different therefrom. In this manner, the downstream EMC filter 6 and/or one or more comparable RLC component(s) of inverter 4 is/are excited into forced oscillations. Depending on how close the test frequency is to the resonant frequency of EMC filter 6, a voltage overshoot and/or a current overshoot will occur at EMC inductor 10 and EMC capacitor 9 of EMV filter 6. When suitably selecting the test frequency to be delivered by inverter 4, it is possible, for example, to obtain an increased AC current 16 between inverter 4 and EMC filter 6 with the voltage at EMC capacitor 9 being of a magnitude that does not exceed the limitations imposed by the components. This increased AC current 16 results, inter alia, in switching losses of the bridge semiconductors of inverter 4, said losses occurring as a function of said increased AC current 16. Since AC current 16 can be varied via the test frequency delivered by inverter 4, it is possible to thereby vary the power loss occurring in inverter 4. This power loss acts as a test load on DC voltage source 2 and is compensated for by DC voltage source 2. The time needed for this varies depending on the electric power available from DC voltage source 2 at a particular time. It is when DC voltage source 2 is able to immediately provide the test load under the prevailing conditions, so that the monitored DC input voltage $U_Q$ or $U_Z$ does not drop by more than a defined threshold, that it is useful to switch DC voltage source 2 into the grid by closing grid disconnect switch 11. In inverter 4, the set test load is converted to heat. However, if the novel method is implemented in a suitable manner, the resulting heating of inverter 4 is not critical. In order to determine the load capability of DC voltage source 2, the inverter is selectively set to a test frequency which, in accordance with the test load to be generated, prevents a voltage or current exceeding the limitations imposed by the components from occurring at the RLC components used for the method.

Because of component tolerances and aging effects, each inverter 4, in combination with a particular EMC filter 6, requires an individual actual test frequency for a given test load. In this connection, the test load that has to be instantaneously provided by DC voltage source 2 in order for it to be safely switched into AC power grid 3 may itself change, for example with variations in AC power grid 3. Therefore, in an advantageous embodiment of the novel method of an embodiment of the present invention, the test frequency of inverter 4, which is used to determine the load capability of DC voltage source 2, is individually adapted to the momentary state and the momentary operating conditions of the particular inverter by means of a fully automated adaptive learning algorithm. This adaptive adjustment of the test frequency can be done in steps during the normal attempts to connect to the grid. It is advantageous to measure the power that is fed into AC power grid 3 by inverter 4 as soon as possible after successful connection to the grid, and to change the test frequency to thereby optimize the test power for the next determination of the load capability of DC voltage source 2 prior to the next closure of grid disconnect switch 11, the goal of this optimization being to gradually minimize the magnitude of the power that is fed into the AC power grid at the moment of connection to the grid. In this manner, it is ensured that DC voltage source 2 is switched into AC power grid 3 as early as possible. If, after determining the load capability of DC voltage source 2 according to the present invention, it is established that voltage $U_Z$ at the DC link of the inverter 4 connected to DC voltage source 2 and/or output voltage $U_Q$ of DC voltage source 2 remain(s) stable even under the activated test load, the DC voltage source is switched into the grid. During this process, any features that may be provided to maintain the DC input voltage of the inverter constant during normal power infeed are advantageously deactivated. In tests, it was found that suitable test frequencies above the grid frequency typically start at about 110 percent of the frequency of AC power grid 3 and, given an inverter clock frequency of 16 kHz, may reach up to about 8 kHz. If a different clock frequency is used, the test frequency range is dimensioned accordingly. The particular test frequencies are obtained by the novel method using the edges of the amplitude resonance response of EMC filter 6. The method of an embodiment of the present invention for determining the load capability of DC voltage source 2 can be started, for example, when the difference between an AC voltage of grid frequency that is generated by inverter 4 while grid disconnect switch 11 is open and while inverter 4 is clocked in a manner enabling four-quadrant operation and the grid peak voltage of the AC power grid measured while grid disconnect switch 11 is open exceeds a threshold value. In this manner, the activation of the method of an embodiment of the present invention is automatically adapted to the conditions currently prevailing in AC power grid 3.

Figures 2, 2A:
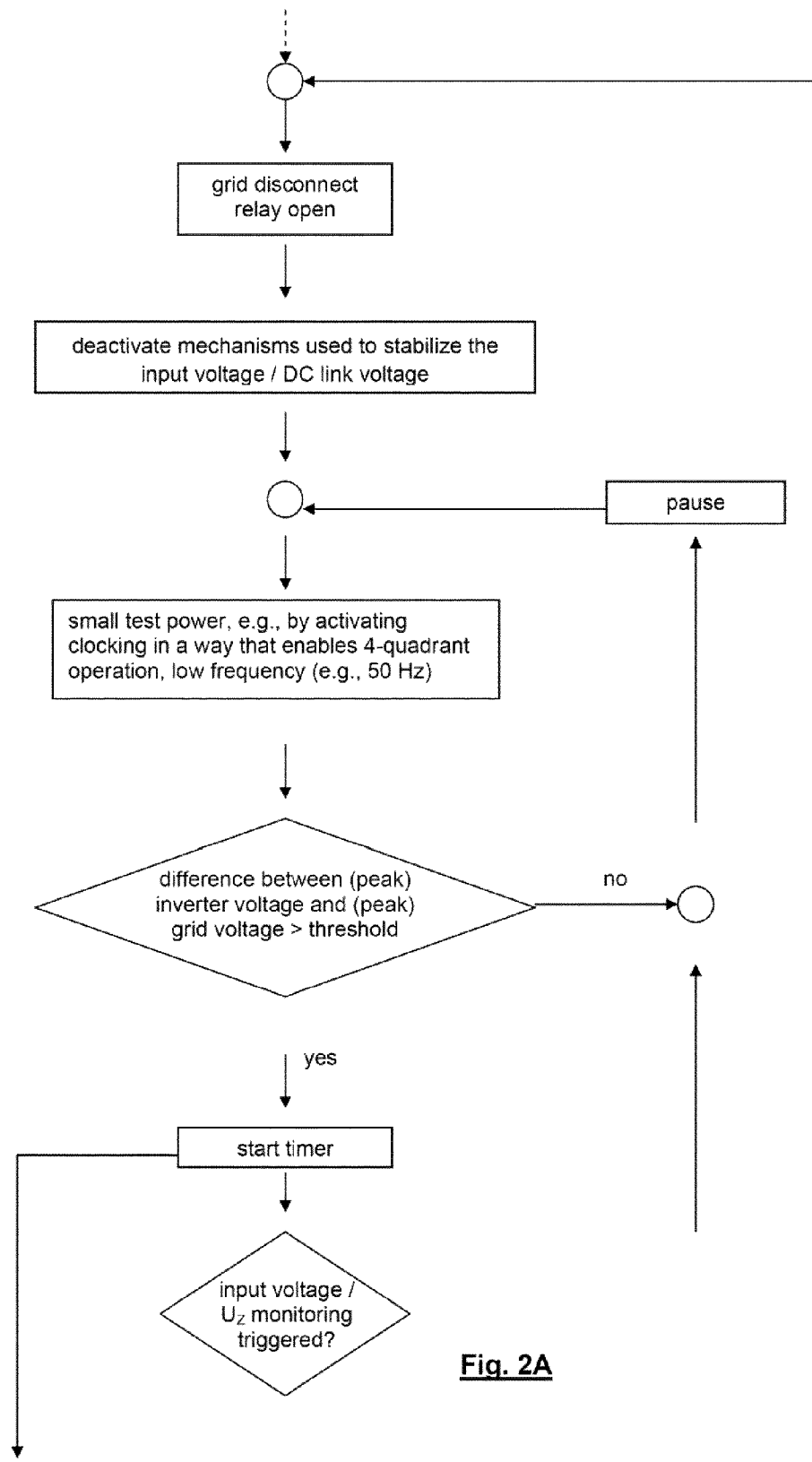
FIG. 2 illustrates a control program for carrying out the inventive method in accordance with an embodiment of the present invention.
Figure 2B:
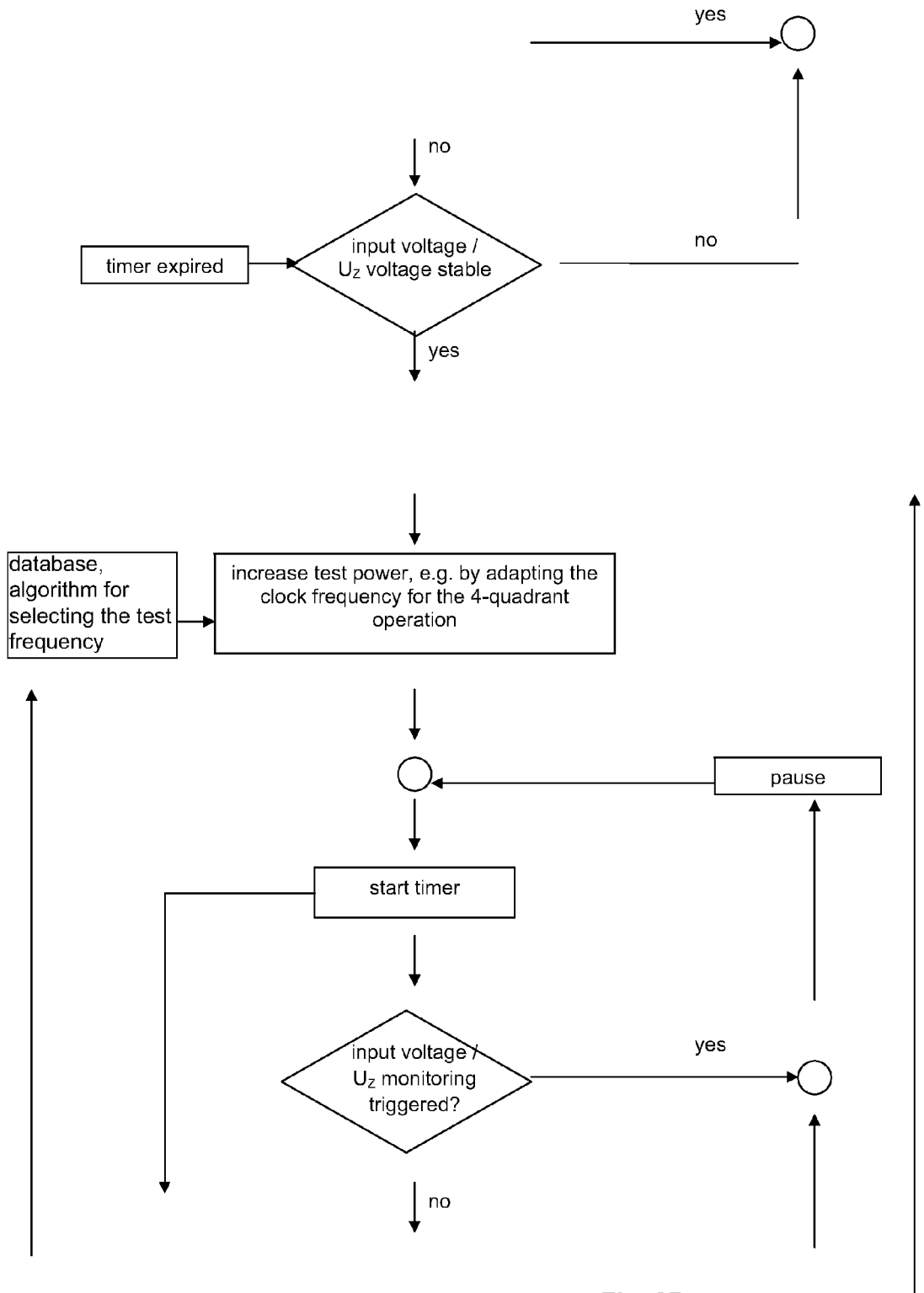
Figure 2C:
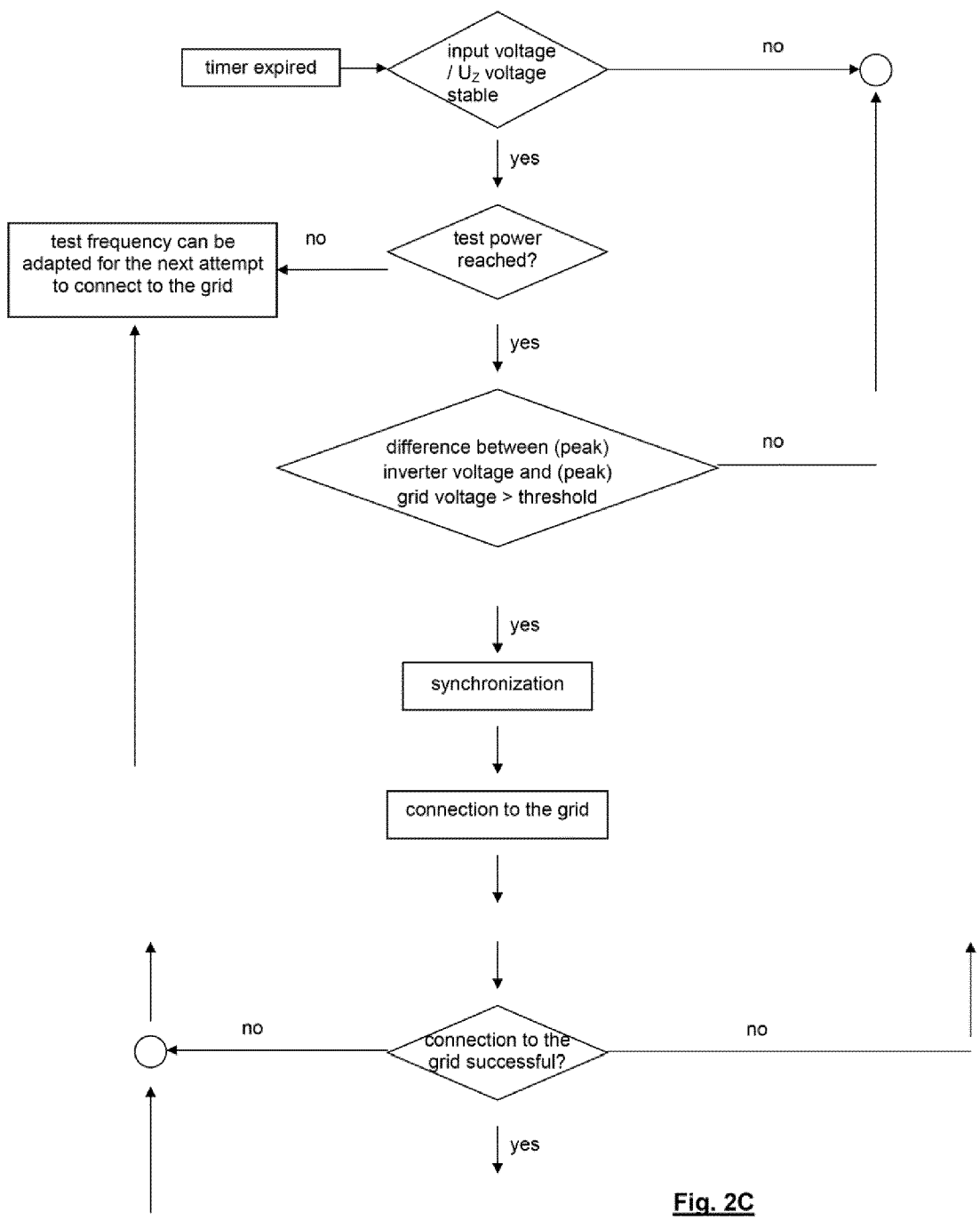
Figure 2D:
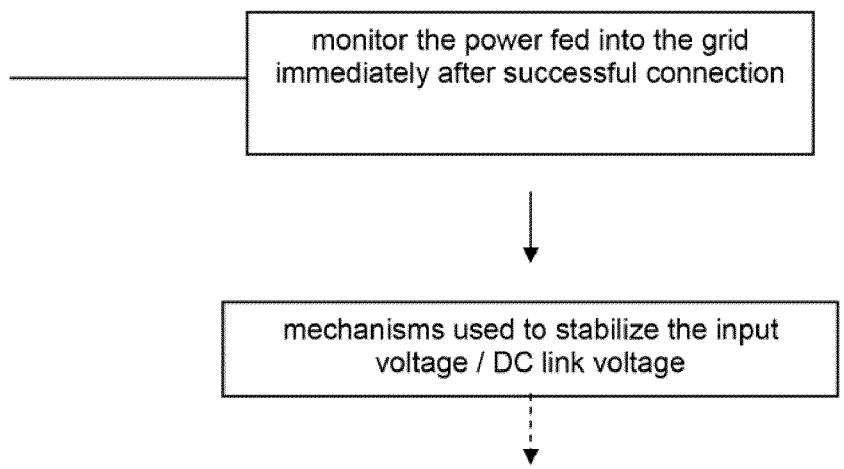

FIG. 2 shows an exemplary flow diagram of the method of the present invention. The starting point is the successful completion of all system tests prior to reaching the method for connecting into the grid; i.e., grid disconnect switch 11 is open. To be able to detect the effects occurring when a load is applied to DC voltage source 2 by inverter 4, all inverter mechanisms used to stabilize DC link 5 are deactivated. After that, initially a small test load is applied to DC voltage source 2, for example by activating the operation of inverter 4 at a clock rate that enables four-quadrant operation. In such a case, it is advantageous if the frequency delivered by inverter 4 is equal to that of AC power grid 3. If, in the process, the difference between the peak voltage of the output voltage of inverter 4 and the peak voltage of the AC voltage of AC power grid 4 does not yet exceed a defined threshold, then inverter 4 is paused. When that pause has ended, the inverter continues activation of the initially small test load. However, if the aforementioned threshold is exceeded, then a timer is started. If, as a result of the activated test load, DC link voltage $U_Z$ should have decreased too much before the expiration of this timer, which would suggest insufficient load capability of DC voltage source 2, then inverter 4 enters the paused state again. Transition into this state occurs also if DC link voltage $U_Z$ has dropped after the expiration of the timer. However, if DC link voltage $U_Z$ remains stable during the entire period during which the small test load is applied, then, in a next step, the test load may be increased by suitably changing the test frequency delivered by inverter 4 from the grid frequency while maintaining four-quadrant operation. The timer is started again to detect the change of DC link voltage $U_Z$ with respect to the now higher test load. If DC link voltage $U_Z$ dips under the higher test load (irrespectively of whether or not the timer has reached its end value), the test load is applied again after the end of a pause. If the test load had no effect on DC link voltage $U_Z$ and the test load tested was the test load required for connection to the grid, then, again, the difference is calculated between the peak voltage of the inverter output voltage when the inverter delivers the grid frequency and the peak voltage of the AC voltage of AC power grid 3. If this difference does not exceed a defined threshold, then the test load used last is tested again after the end of a pause. However, if the aforementioned threshold is reached, then it is possible to synchronize the inverter output voltage with the voltage of the AC power grid and to attempt connection to the grid. If this attempt to connect to the grid by closing grid disconnect switch 11 is successful, the power that is fed into AC power grid 3 by inverter 4 is measured after successful connection to the grid, and, in a further step, the required test frequency is adapted for subsequent attempts to connect to the grid. After that, all mechanisms used to stabilize DC link voltage $U_Z$ can be activated. If the attempt to connect to the grid failed, then the inverter starts a new connectability test, in which the test load required for connection to the grid is increased.

While the invention has been particularly shown and described with reference to preferred embodiments thereof, it will be understood by those skilled in the art that various changes in form and details may be made therein without departing from the spirit and scope of the invention.

LIST OF REFERENCE SYMBOLS 1 device
2 DC voltage source
3 AC power grid
4 inverter
5 DC link
6 EMC filter
7 switch
8 DC link capacitor
9 EMC capacitor
10 EMC inductor
11 grid disconnect switch
12 voltmeter
13 voltmeter
14 voltmeter
15 ammeter
16 AC current
17 controller
$U_Q$ output voltage of DC voltage source 2
$U_Z$ DC link voltage
$U_{AC}$ AC voltage at the output of EMC filter 6

What is claimed is:
1. A method for determining a load capability of a DC voltage source connectable to an AC power grid having a predetermined frequency via an inverter and a grid disconnect switch, comprising the steps of:

controlling, while the grid disconnect switch is in an open position, the inverter so as to convert a DC input voltage to a test frequency different than the predetermined frequency of the AC power grid so as to increase a test load acting on the DC voltage source above an internal consumption of the inverter at the predetermined frequency; and measuring the DC input voltage while the grid disconnect switch is in the open position.

2. The method as recited in claim 1, wherein the controlling is performed so as to successively convert the DC input voltage to different test frequencies.

3. The method as recited in claim 2, wherein the controlling is performed so as to vary the test load acting on the DC voltage source in a stepped manner.

4. The method as recited in claim 1, wherein the test frequency is at least 10 percent lower or higher than the predetermined frequency.

5. The method as recited in claim 1, wherein the test frequency is at least 20 percent lower or higher than the predetermined frequency.

6. The method as recited in claim 1, wherein the test frequency is at least 40 percent lower or higher than the predetermined frequency.

7. The method as recited in claim 1, wherein the test frequency is at least 60 percent lower or higher than the predetermined frequency.

8. The method as recited in claim 1, wherein the test frequency is at least 100 percent lower or higher than the predetermined frequency.

9. The method as recited in claim 4, wherein the predetermined frequency is in a range from 50 to 60 Hz and the test frequency is in a range from 500 Hz to 50 percent of a clock frequency at which fast-clocked switches of the inverter are clocked.

10. The method as recited in claim 1, further comprising the step of tuning the test frequency to a frequency near a respective resonant frequency of at least one an EMC (electromagnetic compatible) filter coupled between the inverter and the grid disconnect switch and an RLC component of the inverter, wherein the frequency is different than the respective resonant frequency.

11. The method as recited in claim 10, wherein the inverter generates an AC current is via at least one of a frequency-dependent impedance of the EMC filter and an RLC component of the inverter.

12. The method as recited in claim 11, wherein the inverter is configured as a load resistance for the AC current.

13. The method as recited in claim 10, further comprising the step of determining the test load by measuring at least one of the AC current and an AC voltage across the EMC filter or the RLC component of the inverter.

14. The method as recited in claim 1, wherein the controlling includes adapting the test frequency to the inverter and an environment of the inverter using a learning algorithm.

15. The method as recited in claim 14, wherein the learning algorithm is carried out in steps during switching of the DC voltage source into the AC power grid via the inverter.

16. The method as recited in claim 14, wherein the learning algorithm uses a database of reference data.

17. The method as recited in claim 1, further comprising steps of:
determining whether the load capability exceeds a predetermined load capability for continuous operation of the inverter on the grid; and
closing the grid disconnect switch so as to switch the DC voltage source into the AC power grid via the inverter after it is determined that the load capability exceeds the predetermined load capability.

18. The method as recited in claim 1, wherein the measuring the DC input voltage is performed while the inverter is enabled for four-quadrant operation.

19. A device for connecting a DC voltage source to an AC power grid having a predetermined frequency, comprising:
an inverter and a grid disconnect switch configured to connect the DC voltage source to the AC power grid;
a measuring device configured to measure a DC input voltage of the inverter; and
a controller configured to control the inverter while the grid disconnect switch is in an open position so as to convert the DC input voltage to a test frequency different than the predetermined frequency of the AC power grid so as to increase a test load acting on the DC voltage source above an internal consumption of the inverter at the predetermined frequency.

20. The device as recited in claim 19, further comprising an EMC filter interconnected between the inverter and the grid disconnect switch.

21. A method for determining a load capability of a DC voltage source connectable to an AC power grid having a grid frequency via an inverter and a grid disconnect switch, comprising:
opening the grid disconnect switch;
operating the inverter at a test frequency different from the grid frequency, wherein the test frequency is selected such that the internal power consumption of the inverter is increased compared to the internal power consumption of the inverter at the grid frequency; and
closing the grid disconnect switch should a voltage provided by the DC voltage source exceeds a predetermined voltage threshold.

22. The method as recited in claim 21, further comprising synchronizing the inverter with the AC power grid before closing the grid disconnect switch.

* * * * *